March 10, 1959  F. E. OBERMAIER  2,876,754
THERMALLY OPERATED CONTROL DEVICES
Filed Sept. 10, 1956  3 Sheets-Sheet 1

Inventor
FRANK E. OBERMAIER

March 10, 1959   F. E. OBERMAIER   2,876,754
THERMALLY OPERATED CONTROL DEVICES
Filed Sept. 10, 1956   3 Sheets-Sheet 2

Inventor
FRANK E. OBERMAIER
By Hill, Sherman, Meroni, Gross & Simpson Attys

March 10, 1959
F. E. OBERMAIER
2,876,754
THERMALLY OPERATED CONTROL DEVICES
Filed Sept. 10, 1956
3 Sheets-Sheet 3
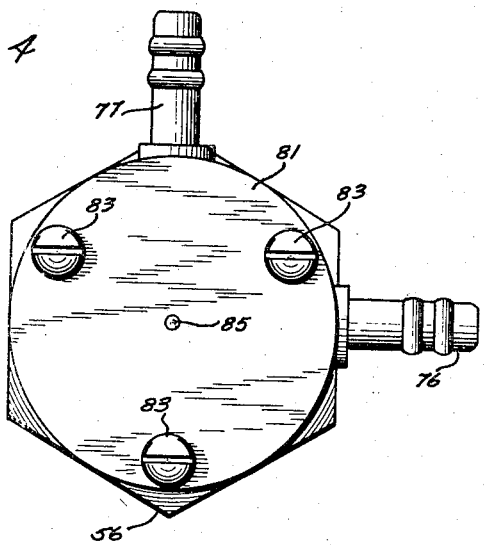
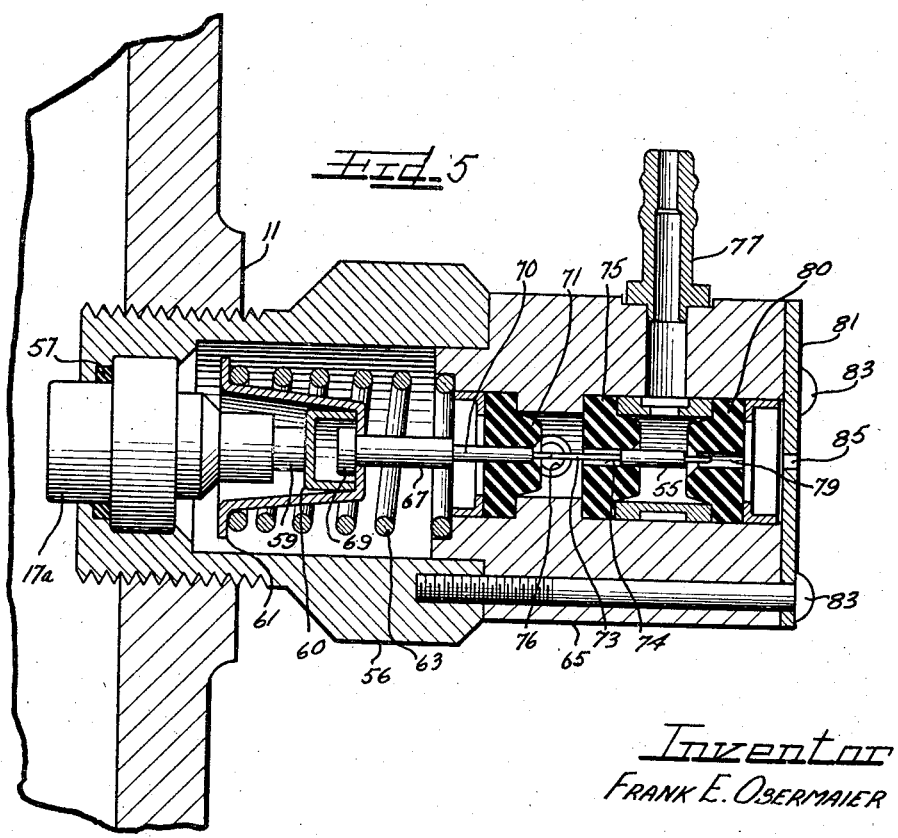
Inventor
FRANK E. OBERMAIER
By
Attys United States Patent Office 2,876,754
Patented Mar. 10, 1959

2,876,754

THERMALLY OPERATED CONTROL DEVICES

Frank E. Obermaier, Oak Park, Ill., assignor to The Dole Valve Company, Chicago, Ill., a corporation of Illinois Application September 10, 1956, Serial No. 608,981

14 Claims. (Cl. 123—117)

This invention relates to improvements in thermally operated control devices particularly adapted to control the operation of automatic spark controls and the like.

A principal object of the invention is to provide a simple and improved form of thermally operated control device sensing the temperature of the coolant of an internal combustion engine to effect advance of the spark as the engine reaches its operating temperature, and to maintain the spark advanced upon cooling of the engine until the engine reaches a predetermined low temperature, at which time the spark will be automatically retarded.

A further object of the invention is to provide a simple and improved form of control device for reducing the time required for warming up an internal combustion engine by maintaining the spark retarded until the engine reaches its normal operating temperature and maintaining the spark advanced during running of the engine, over a wide range of temperature variations.

Still another object of the invention is to provide a novel form of control unit for controlling the vacuum to a device to be operated, such as an automatic spark advance, so arranged as to reduce engine warm-up time by withholding vacuum from the spark advancer until the engine reaches its normal operating range and to maintain the supply of vacuum to the automatic spark advancer during running of the engine over a wide range of temperature variations, and shut off the supply of vacuum to the spark advancer at a predetermined low temperature range substantially lower than the normal operating temperature range of the internal combustion engine.

Still another object of the invention is to provide a thermally operated control device controlling the supply of vacuum to the automatic spark advancer of an internal combustion engine, in which a valve is provided withholding vacuum from the spark advancer until the engine reaches its normal operating temperature range, in which the supply of vacuum to the spark advancer is maintained until the engine reaches a predetermined low temperature, and in which the control of the valve is attained by a thermal element in heat sensing relation with respect to the coolant of the internal combustion engine and having an active stage at a relatively low temperature range, a relatively dormant stage at an intermediate temperature range, and an active stage at the normal temperature range of operation of the internal combustion engine together with a lost motion connection from the thermal element to the valve operative during opening and closing of the valve.

Still another object of the invention is to provide a novel and improved form of thermally operated vacuum control valve having one operating range at a high temperature range and a second operating range at a substantially lower temperature range.

Still another object of the invention is to provide a simple and improved vacuum control valve opening to connect a device to be operated at a high temperature range of operation of the valve and closing to cutoff the device from the source of vacuum at a low temperature range of operation of the valve, in which a two-stage thermal element having low temperature and high temperature active stages with an intermediate dormant stage is utilized to operate and control operation of the valve to effect opening at a high temperature range and closing thereof at a predetermined low temperature range, determined by the low temperature active stage of the thermal element.

These and other objects of the invention will appear from time to time as the following specification proceeds and with reference to the accompanying drawings wherein:

Figure 4 is a plan view of a modified form of vacuum control device constructed in accordance with the principles of the present invention;

Figure 5 is a sectional view of the modified form of vacuum control device constructed in accordance with the invention, taken in substantially the same plane as Figure 3.

Figure 1:
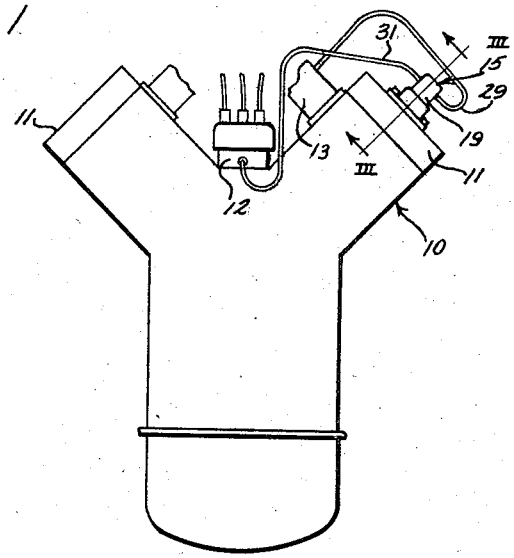
Figure 1 is a diagrammatic end view of the engine block of an internal combustion engine with certain parts broken away.

Referring now to Figure 1 of the drawings, I have diagrammatically shown a V type of engine block 10 of an internal combustion engine of the water cooled type having cylinder heads 11. A distributor and automatic spark advancer 12 for the engine is shown, which may be operated by vacuum in a conventional manner. The vacuum may be supplied by the venturi of the carburetor (not shown) for the internal combustion engine, but is herein shown as being supplied from an intake manifold 13 of the internal combustion engine, under the control of a vacuum control device 15. Said vacuum control device may be mounted on a cylinder head 11 of the internal combustion engine, and may position a casing 16 of a thermal element 17 in contact with the cylinder head or in the water jacket in contact with the coolant therein to sense the temperature thereof.

The distributor and vacuum operated automatic spark advancer may be of any well known form, commonly used for internal combustion engines and are no part of the present invention, so are only shown in a diagrammatic form in Figure 1, for the purpose of illustrating the control function of the vacuum control device of the invention.

The vacuum control device 15 is shown as including a housing 19, which may be a stamped metal housing and includes an outer generally bell-shaped housing portion 20 on the outside of the cylinder head 11 and an inner housing portion 21 extending within an apertured portion 22 of the cylinder head. The thermal element 17 is seated in and extends through the inner wall of the inner housing portion 21 and is positioned thereby in the water jacket of the internal combustion engine. An annular seal 18 is provided to seal said thermal element to said housing portion. The housing 19 is sealed to the cylinder head 11 as by an annular seal 23, encircling the inner housing portion 21 and abutting the cylinder head at one side and a flange 24 of the inner housing portion at its opposite side.

The outer housing portion 20 has a flange 25 in juxtaposition to the flange 24, which is crimped or spun over the flange 24 to retain the housing portions in connected relation with respect to each other and in sealing engagement with an annular seal 26, interposed between the flanges 24 and 25. The outer housing portion 20 is shown as having an outlet 27 leading therefrom and connected with a source of vacuum, such as the venturi of a carburetor (not shown) of an internal combustion engine, by a flexible tube 29. The outer housing portion 20 also has a vacuum output connector 30 leading thereinto and connected with the automatic spark advancer 12 by a flexible tube 31 supplying the necessary vacuum to operate the spark advancer to advance the spark, when the coolant of the engine reaches the operating temperature of the engine. The housing 19 and seal 23 are maintained in sealing engagement with the cylinder head 11 as by cap screws 32 extending through the flanges 25 and 24 and threaded within the cylinder head.

The outlet 27 and the vacuum output 30 are separated within the housing 19 by a resilient wall 33, which may be made from rubber, an elastomer and the like. The wall 33 is shown as being relatively thick to give it rigidity and to limit flexing thereof in an axial direction, and has an aperture 35 leading therethrough having a valve 36 movable therealong.

The valve 36 is shown as having an elongated body having a transverse passageway 37 therein adjacent the outer end thereof, and having an axial passageway 39 communicating with said transverse passageway and opening to the inner end of the valve body. The valve body has a flange 40 at its inner end engaged by an inturned end portion 41 of a stirrup 43 forming a seat for a spring 44, forming the return spring for a power member 45 of the thermal element 17. The spring 44 is seated at its end opposite the stirrup 43 on a seating member 46, encircling the valve 36 and bearing against the wall 33.

The power member 45 of the thermal element 17 bears against an open spider 47 engaging a shouldered portion 49 of the stirrup 43, to effect movement of said stirrup along the valve 36, and then to effect engagement of said stirrup with said valve and move said valve along the resilient wall 33, for bringing the transverse passageway 37 into position to effect the supply of vacuum to the vacuum output connection 30 and effect the advance of the spark. The flanged portion 40 of the valve 36 is provided with transverse passageways 50 communicating with the passageway 39, to accommodate the free flow of air at negative pressures from the vacuum output 30 through the transverse passageway 37 and the axial passageway 39, upon engagement of the spider 47 with the inner end of the flange 40 and upon movement of the valve 36 to bring the passageway 37 on the outside of the wall 33.

Upon predetermined reductions in temperature, the return spring 44 will first move the stirrup 43 along the valve 47 until the flanged portion 41 of said stirrup engages the flange 40. The spring 44 will then move the valve 46 to the closed position shown in Figure 3, to block vacuum from the automatic spark advancer.

In order to attain fast engine warmup, it is advantageous to withhold vacuum from the automatic spark advancer until the engine has come up to its predetermined operating temperature, and when the engine does come up to this operating temperature, to instantaneously open the valve 36 to supply vacuum to advance the spark. It is also of advantage to maintain the supply of vacuum to the spark advancer after the valve 36 has opened and the engine is running over a wide temperature range to maintain the spark advanced during running of the engine, and to close the valve 36 and disconnect the vacuum from the automatic spark advancer at a relatively low engine temperature, and when reaching this engine temperature to instantaneously close the valve 36.

This is attained by providing a lost motion drive connection from the power member 45 to the valve 36, operative in both directions of travel of the power member to accommodate an initial movement of the power member prior to moving the valve toward its open position, and to accommodate an initial amount of retractible movement of the power member 45 prior to moving the valve toward its closed position, and also by utilizing a two-stage thermal element to open the valve 36 and control closing thereof.

Such a two-stage thermal element may be a thermal element which is active at a low temperature range, as for example, 40 to 60° F. and is relatively dormant at an intermediate temperature range as from 60 to 140° F. and then is active at a high temperature range as from 140 to 160° F. The active and dormant stages of the thermal element are attained by mixing a wax of one fraction having a low melting point, with a wax of another fraction having a high melting point, with a powdered metal heat conducting material with or without a binder, and in containing the mixture of high and low melting point fusible materials within the casing 16 of the thermal element to react against a diaphragm (not shown) and extend the power member 45 from a cylinder 51 of the thermal element in two active stages.

Figure 6:
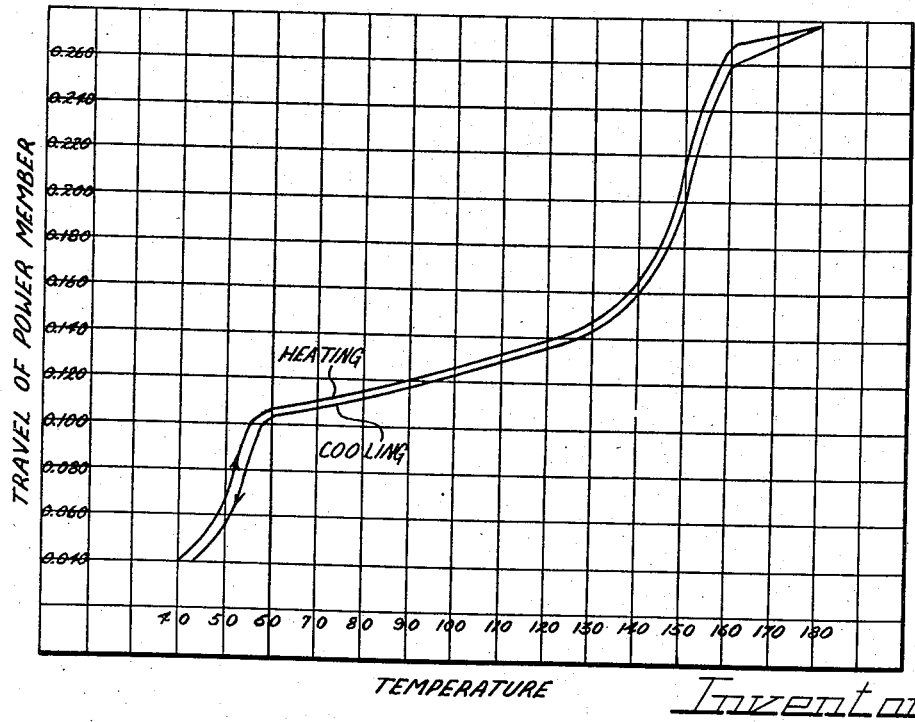
Figure 6 is a graph showing the travel and temperature range of operation of a form of thermal element particularly adapted to operate the valve of the invention.

Thus, as the thermal element is heated to a temperature of around 40°, as shown in Figure 6, the low melting point material will become active and the power member 45 will be extended from the cylinder 51 at a relatively high rate of travel as indicated by the curve in Figure 6. At substantially 60°, the thermally expansible material will become relatively dormant until a temperature of 140° is reached. During the first part of extensible movement of the power member 45, the lost motion in the drive to the valve 36 may be taken up. During the relatively dormant stage from 60° to 140° there will be some extensible movement of the power member 45. This will result in the movement of the valve 36 toward an open position. During the last part of extensible movement of the power member 45 the activity of the element will rapidly extend the power member to instantaneously open the valve to supply vacuum through the vacuum output to effect the advance of the spark.

As the thermal element cools the lost motion in the drive to the valve 36 will first be taken up. The valve will then gradually be moved toward a closed position but the motion will not be sufficient to close the valve until a temperature of substantially 60° is reached, at which temperature the spring 44 will rapidly return the power member to effect substantially instantaneous closing of the valve.

Figure 2:
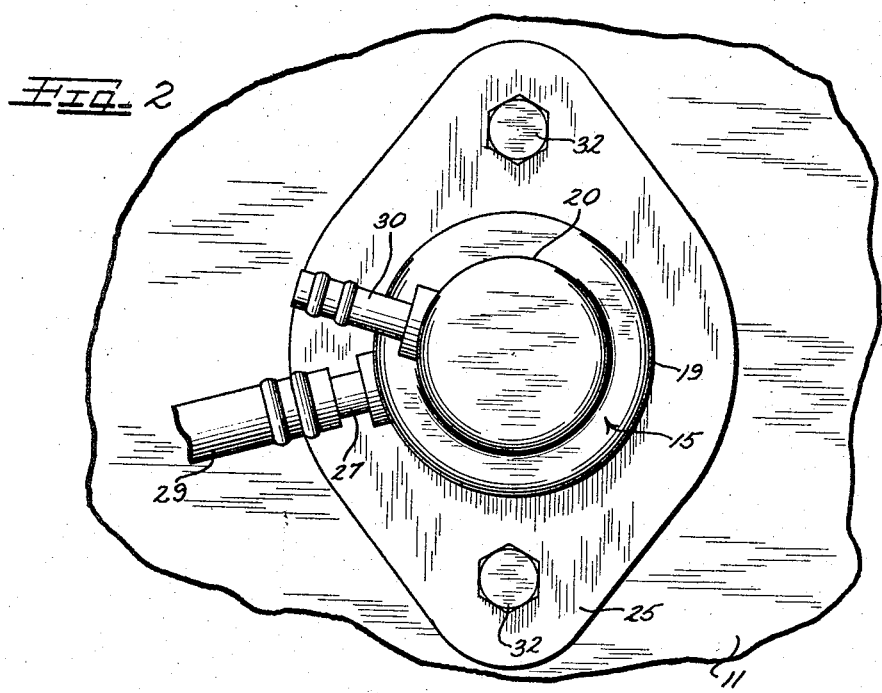
Figure 2 is a plan view of the vacuum control device mounted on the cylinder head of an internal combustion engine.
Figure 3:
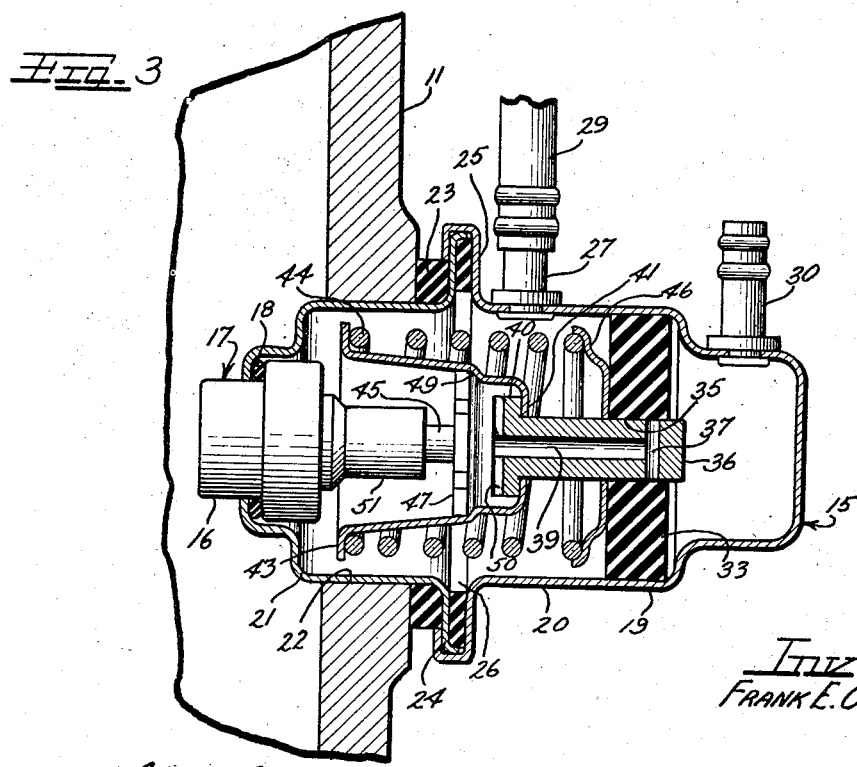
Figure 3 is a sectional view taken substantially along line III—III of Figure 1.

In the modified form of the invention illustrated in Figures 4 and 5, the principle of operation of the valve is similar to that shown in Figures 2 and 3 except the vacuum output is vented to the atmosphere when a vacuum control valve 55 is in the closed position shown in Figure 5.

In this form of the invention a threaded coupling member 56 has a thermal element 17a seated therein and sealed thereto as by an annular seal 57. The threaded coupling member 56 is shown as being threaded in the cylinder head 11 and positioning the thermal element 17a in the path of the flow of coolant along the water jacket of the internal combustion engine. The thermal element 17a is a two-stage thermal element like the thermal element 17, and has an extensible power member 59 reacting against the bottom of a generally cup-like reaction member 60, seated within a stirrup or seating member 61 for a compression spring 63, forming a return spring for the thermal element and seated on the inner end of a valve block 65, at its end opposite the stirrup 61.

The valve 55 has an enlarged diameter stem portion 67 slidably guided in the inner end wall of the stirrup 61. The stem 67 has a head 69 at its inner end engaging the opposite side of the inner end wall of the stirrup 61 from the valve 55. The head 69 is abutted by the bottom of the cup-like reaction member 60 upon sufficient extensible movement of the power member 59 to take up the lost motion between said reaction member and head, and is engaged by the end wall of the stirrup 61 upon sufficient retractible movement of the power member 59 to take up the lost motion between said wall and head.

The stem 67 has a reduced diameter portion 70 slidably movable along a sealing bushing 71, sealing the valve body 65 and also forming a seal to seal the stem 71 to prevent the leakage of air along said stem into the valve body 65. The valve 55 also has a reduced diameter stem portion 73 connecting the stem 70 with the valve 55 and accommodating vacuum to flow through a port 74 in a bushing 75 through a vacuum outlet 76, to connect a vacuum output 77 to a source of vacuum.

Upon extensible movement of the power member 59 a distance sufficient to move the valve 54 to open the port 74, the valve 55 will move into engagement with a port 79 in a bushing 80, to close said port from air at atmosphere pressure.

The valve block 65 has a plate 81 secured to its outer end as by machine screws 83, which also secure said valve block to the coupling member 56. The plate 81 is provided with a vent 85 for venting the vacuum output connection 77 to atmosphere upon retractible movement of the power member 59 to the position shown in Figure 5.

With the valve illustrated in Figures 4 and 5, as the thermal element 17a is heated to its initial or first active stage, the power member 59 will move the cup-like reaction member 60 and stirrup 61 along the stem 67 of the valve 55 to engage said reaction member with the head 69 of said stem. Continued extensible movement of the power member 59 during the dormant stage of the thermal element, will move the valve 55 toward an open position and in position to close the vent 79. The valve, however, will not completely open until the temperature to which the thermal element is subjected reaches a temperature of substantially 140°, at which time the thermal element will again become active and rapidly move the valve 55 to open the port 74 and close the port 79, to connect the vacuum output 77 with a source of vacuum and effect the automatic advance of the spark, and maintain said vacuum output connected with a source of vacuum until the temperature drops to a temperature of approximately 60° F., at which time the valve will rapidly close as is the first form of my invention.

It will be understood that modifications and variations in the present invention may be effected without departing from the spirit and scope of the novel concepts thereof.

I claim as my invention:

1. In a vacuum control device particularly adapted for automatic spark advancers for internal combustion engines, a housing, an outlet from said housing adapted to be connected to a source of vacuum, a vacuum output leading into said housing and adapted to be connected with an automatic spark advancer and the like, valve means within said housing controlling the supply of vacuum to said vacuum output, and a single thermal element having a power member, extensible upon predetermined increases in temperature to open said valve means to said vacuum output to supply vacuum to advance the spark only when the engine reaches its operating temperature and maintain said valve means open over a wide range of temperature drop, and to accommodate said valve means to close at a substantially lower temperature than the opening temperature of said valve means.

2. In a vacuum control device particularly adapted for automatic spark advancers for internal combustion engines, a housing, an outlet from said housing adapted to be connected to a source of vacuum, a vacuum output leading into said housing and adapted to be connected with an automatic spark advancer and the like, valve means within said housing controlling the supply of vacuum to said vacuum output, a thermal element having a casing containing a fusible thermal expansible material and an extensible power member extensible upon predetermined increases in temperature, and a lost motion connection between said power member and said valve means operable upon extensible and retractible movement of said power member to effect opening of said valve means to said vacuum output to supply the vacuum to advance the spark when the engine reaches its operating temperature, and accommodating closing of said valve means at a substantially lower temperature.

3. In a vacuum control device particularly adapted for automatic spark advancers for internal combustion engines, a housing, an outlet from said housing adapted to be connected with a source of vacuum, a vacuum output leading into said housing and adapted to be connected with an automatic spark advancer and the like, valve means in said housing controlling the supply of vacuum to said vacuum output, and a two-stage thermal element having a casing adapted to be positioned in heat association with the coolant of the internal combustion engine and having an extensible power member having a high rate of travel at predetermined low and high temperature ranges and a low rate of travel at intermediate temperature ranges and having operative connection with said valve means to rapidly open said valve means to said vacuum output to supply vacuum to advance the spark when the engine reaches its operating temperature, and to accommodate said valve means to rapidly close at a substantially lower temperature.

4. In a vacuum control device particularly adapted for an internal combustion engine to control an automatic spark advancer therefor, a housing, a vacuum outlet from said housing adapted to be connected with a source of vacuum, a vacuum output leading into said housing and adapted to be connected with an automatic spark advancer and the like, valve means within said housing controlling the supply of vacuum to said vacuum output, a thermal element having a power member extensible at a relatively rapid rate of travel at predetermined low and high temperature ranges and having a relatively slow travel at intermediate temperature ranges, and a lost motion connection between said power member and said valve means to effect opening of said valve means to said vacuum output to supply vacuum to advance the spark when the engine reaches its operating temperature, and to accommodate said valve means to close at a temperature determined by the low temperature high travel operating range of the thermal element.

5. In a vacuum control device particularly adapted for internal combustion engines to control an automatic spark advancer therefor, a housing, an outlet from said housing adapted to be connected with a source of vacuum, a vacuum output leading into said housing and adapted to be connected with an automatic spark advancer, valve means within said housing controlling the supply of vacuum to said vacuum output, a two-stage thermal element comprising a casing containing a fusible thermally expansible material having a low melting point range and a high melting point range, a power member extensible with respect to said casing at a high rate of travel at a low temperature melting point range of said thermal element, at a low rate of travel at an intermediate temperature melting point range and at a high rate of travel at a high temperature melting point range determined by the operating temperature of the internal combustion engine, and a lost motion connection from said power member to said valve means operative in both directions of travel of said power member to effect opening of said valve means to supply vacuum to said vacuum output at the high melting point rage of the thermal element, and to maintain said valve means open until the temperature is reduced to the low melting point range of the thermal element, to accommodate fast closing of said valve means.

6. In a vacuum control device particularly adapted for internal combustion engines to control an automatic spark advancer therefor, a housing, an outlet from said housing adapted to be connected with a source of vacuum, a vacuum output leading into said housing adapted to be connected to an automatic spark advancer, valve means within said housing controlling the supply of vacuum to said vacuum output, a two-stage thermal element within said housing having a casing extending to the outside of said housing in position to sense the temperature of the coolant of the internal combustion engine and containing fusible thermal expansible materials having a low temperature melting point range and a high temperature melting point range, a power member extensible with respect to said casing with an initial high rate of travel at the low temperature melting point range of said thermal element, a final high rate of travel at the high temperature melting point range of said thermal element and an intermediate low rate of travel between said high and low temperatures melting point ranges, spring means returning said power member upon reductions in temperature, and a lost motion connection between said power member and said valve means operative in both directions of travel of said power member to effect quick opening of said valve means at a high temperature range only and to maintain said valve means open upon lowering of the temperature to said low temperature range, and then accommodating said spring means to rapidly retract said power member and effect quick closing of said valve means.

7. In a vacuum control valve, a valve housing, an outlet from said housing adapted to have connection with a source of vacuum, a vacuum output connection into said housing, a wall between said outlet and said vacuum output connection, said wall having an axially apertured portion, a valve slidably mounted in said axially apertured portion and controlling the flow of air at negative pressure from said vacuum output to said outlet, means for operating said valve to open said port to supply vacuum to said vacuum output comprising a thermal element having a casing seated in said housing and extending outside of said housing to sense a temperature on the outside of said housing, and having a power member extensible in two operating stages, and a lost motion connection between said power member and said valve accommodating initial high travel of said power member with no effect on said valve and rapidly opening said valve member at the high temperature stage of operation of said thermal element and maintaining said valve member open until the low temperature stage of operation of said thermal element and then accommodating said thermal element to rapidly close said valve.

8. A vacuum control valve comprising a valve housing, an outlet from said housing, a vacuum output connection leading into said housing, a yieldable wall between said outlet and said vacuum output connection, a valve guided for movement through said wall and controlling the flow of air at negative pressures from said vacuum output to said vacuum outlet, a thermal element having a casing seated in said housing and extending to the outside thereof to sense a temperature on the outside of said housing and containing a fusible thermally expansible material having a low temperature and a high temperature fusion range and having a power member extensible from said casing at relatively high rates of travel at said low and high temperature fusion ranges and at low rate of travel intermediate said low and high temperature fusion ranges, a lost motion connection between said power member and said valve operative in both directions of travel of said valve, and spring means returning said power member and closing said valve in accordance with the cooling of the fusible material contained within said casing.

9. A vacuum control valve comprising a valve housing, an outlet from said housing, a vacuum output connection leading into said housing, a resilient wall between said outlet and said vacuum output connection, a valve slidably guided in said wall for movement therealong and sealed thereby and having a central flow passageway extending therealong for a portion of the length thereof and a transverse flow passageway communicating with said central flow passageway and opening to opposite sides of said valve, and sealed by said wall to withhold vacuum from said vacuum output connection, a thermal element including a casing seated within said housing and extending to the outside thereof for sensing a temperature on the outside of said housing and containing a fusible thermally expansible material and having a power member extensible with respect to said casing upon predetermined increases in temperature, and spring means for returning said power member upon reductions in temperature.

10. A vacuum control valve comprising a valve housing, an outlet from said housing, a vacuum output connection leading into said housing, a resilient wall between said outlet and said vacuum output connection, a valve slidably guided in said wall for movement therealong and sealed thereby and having a central flow passageway extending therealong for a portion of the length thereof and a transverse flow passageway communicating with said central flow passageway and opening to opposite sides of said valve, and sealed by said wall to withhold vacuum from said vacuum output connection, a thermal element including a casing seated within said housing and extending to the outside thereof for sensing a temperature on the outside of said housing and containing a fusible thermally expansible material and having a power member extensible with respect to said casing upon predetermined increases in temperature, and a lost motion connection between said power member and said valve operable in both directions of travel of said power member.

11. A vacuum control valve comprising a valve housing, a vacuum outlet from said housing, a vacuum output connection leading into said housing, a resilient wall between said outlet and said vacuum output connection, a valve axially guided in said wall for movement therealong and having an axial passageway extending therealong for a portion of the length thereof and communicating with said axial passageway and sealed by said wall when the valve is closed and moving into communication with said vacuum output to connect said vacuum outlet to said vacuum output, a stirrup slidably mounted on said valve and having abutting engagement therewith, spring means biasing said stirrup in a direction to close said valve, an abutment member within said stirrup in spaced relation with respect to the end of said valve, a thermal element seated in said housing and having a casing on the outside thereof, and a power member guided for extensible and retractible movement with respect to said casing, said power member being in axial alignment with and spaced from said abutment and being movable to engage said abutment and move said valve toward an open position.

12. A vacuum control valve comprising a valve housing, a vacuum outlet from said housing, a vacuum output connection leading into said housing, a resilient wall between said outlet and said vacuum output connection, a valve axially guided in said wall for movement therealong and having an axial passageway extending therealong for a portion of the length thereof and communicating with said vacuum outlet and having a transverse passageway communicating with said axial passageway and sealed by said wall when the valve is closed and moving into communication with said vacuum output to connect said vacuum outlet to said vacuum output, a stirrup slidably mounted on said valve and having abutting engagement therewith, spring means biasing said stirrup in a direction to close said valve, an abutment member within said stirrup in spaced relation with respect to the end of said valve, a power member spaced from said abutment member in position to engage said abutment with said valve and move said valve toward an open position, and a thermal element seated in said housing and having a casing on the outside thereof and having said power member guided for extensible and retractible movement with respect thereto, said thermal element being a two-stage thermal element having a fusible material contained within said casing having a low and a high temperature fusion range to effect relatively high rates of travel of said power member at the low and high fusion ranges of said thermal element to accommodate travel of said power member to engage said abutment member with said valve at the low temperature fusion range of said thermal element, and to rapidly move said valve to effect quick opening thereof at the high temperature fusion range of said thermal element and to maintain said valve open until reductions in the temperature to the low temperature fusion range of said thermal element.

13. A vacuum control valve comprising a valve housing, a vacuum outlet from said housing, a vacuum output connection leading within said housing, spaced resilient walls on opposite sides of said vacuum output connection and having ports axially leading therethrough, a vent in said housing on one side of said vacuum output, a valve guided for movement along said walls and movable to close the port leading to one of said walls to block the venting of said vacuum output to the atmosphere and to open the port leading through the other of said walls to connect said vacuum output with a source of vacuum, a thermal element seated within said housing and having an extensible power member in axial alignment with said valve, spring means returning said power member upon predetermined reductions in temperature, and a lost motion connection between said power member and said valve operable in both directions of travel of said power member.

14. A vacuum control valve comprising a valve housing, a vacuum output connection leading within said housing, spaced resilient walls on opposite sides of said vacuum output connection and having ports leading therethrough in an axial direction, a vent in said housing on one side of said vacuum output, a vacuum outlet from said housing on the opposite side of said vacuum output, a valve guided for movement along said walls and movable to close the port leading to one of said walls to block the venting of said vacuum output to the atmosphere and to open the port leading through the other of said walls to connect said vacuum output with a source of vacuum, a thermal element seated within said housing and having a casing on the outside of said housing sensing the temperature on the outside of said housing and containing a fusible material having a low and a high temperature range of fusion, a power member extensible with respect to said casing at relatively high rates of travel at the low and high temperature fusion ranges of the fusible material contained within said casing and at a negligible rate of travel intermediate said low and high temperature fusion ranges, a spring returning said power member upon reductions of temperature, and a lost motion connection between said power member and said valve to effect quick opening of said valve at said high fusion range of said thermal element only and to effect quick closing of said valve at said low temperature fusion range of said thermal element.

References Cited in the file of this patent

UNITED STATES PATENTS

| | | |
|---|---|---|
| 1,785,902 | Hardman | Dec. 23, 1930 |
| 2,394,792 | MacMillan | Feb. 12, 1946 |
| 2,581,582 | Ferris | Jan. 8, 1952 |
| 2,668,014 | Lund | Feb. 2, 1954 |
| 2,672,293 | Ludlow | Mar. 16, 1954 |